US012586463B2

(12) United States Patent
Kohara

(10) Patent No.: US 12,586,463 B2
(45) Date of Patent: Mar. 24, 2026

(54) DETERMINATION DEVICE, DETERMINATION METHOD, AND PROGRAM

(71) Applicant: TOYOTA JIDOSHA KABUSHIKI KAISHA, Toyota (JP)

(72) Inventor: Takahiro Kohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 505 days.

(21) Appl. No.: 18/151,905

(22) Filed: Jan. 9, 2023

(65) Prior Publication Data

US 2023/0260394 A1 Aug. 17, 2023

(30) Foreign Application Priority Data

Feb. 16, 2022 (JP) ................................ 2022-021777

(51) Int. Cl.
*G08G 1/052* (2006.01)
*G08G 1/01* (2006.01)

(52) U.S. Cl.
CPC .......... *G08G 1/0133* (2013.01); *G08G 1/052* (2013.01)

(58) Field of Classification Search
None
See application file for complete search history.

(56) References Cited

U.S. PATENT DOCUMENTS 9,969,261 B2 5/2018 Kodama
10,045,173 B1 8/2018 Morimura et al.
10,106,157 B2 10/2018 Sawada et al.
10,150,407 B2 12/2018 Takahashi et al.
10,696,297 B2 6/2020 Nguyen Van et al.
11,001,255 B2 5/2021 Fukuman et al.
11,110,937 B2 9/2021 Kinoshita et al.
(Continued)

FOREIGN PATENT DOCUMENTS

JP 2020-154506 A 9/2020
JP 2020-187456 A 11/2020
(Continued)

OTHER PUBLICATIONS

Extended European Search Report dated Jun. 12, 2023 in European Application No. 23156630.8.

*Primary Examiner* — Angela Y Ortiz
*Assistant Examiner* — Laura E Linhardt
(74) *Attorney, Agent, or Firm* — Sughrue Mion, PLLC

(57) ABSTRACT

To effectively increase determination accuracy for road rage, provided is a determination device including: a close state determination unit (12) configured to determine whether a first vehicle (V1) and a second vehicle (V2) are in a predetermined close state; a third vehicle determination unit (11) configured to determine whether a third vehicle (V3) traveling in front of the second vehicle (V2) exists; and a road rage determination unit (16) configured to avoid determining that the road rage is being executed when at least one condition of a first condition that the close state determination unit (12) determines that the close state exists and a second condition that the third vehicle determination unit (11) determines that the third vehicle does not exist is not satisfied, and to determine that the road rage is being executed when the first condition and the second condition are satisfied.

9 Claims, 6 Drawing Sheets

(56) References Cited

U.S. PATENT DOCUMENTS

| | | | | |
|---|---|---|---|---|
| 2017/0279957 | A1* | 9/2017 | Abramson et al. | G06F 21/36 |
| 2019/0001968 | A1 | 1/2019 | Yorifuji et al. | |
| 2019/0344828 | A1 | 11/2019 | Omori et al. | |
| 2019/0389488 | A1 | 12/2019 | Yamada et al. | |
| 2021/0253099 | A1* | 8/2021 | Gotoh | B60W 30/146 |
| 2023/0191911 | A1* | 6/2023 | Izumi | B60K 35/10<br>701/36 |

FOREIGN PATENT DOCUMENTS

| | | | |
|---|---|---|---|
| JP | 2020-201753 | A | 12/2020 |
| JP | 2021-56603 | A | 4/2021 |
| JP | 2021-114274 | A | 8/2021 |
| JP | 6942913 | B1 | 9/2021 |
| WO | 2019/167247 | A1 | 9/2019 |
| WO | 2020/230683 | A1 | 11/2020 |

* cited by examiner

DETERMINATION DEVICE, DETERMINATION METHOD, AND PROGRAM

BACKGROUND OF THE INVENTION

1. Field of the Invention

The present disclosure relates to a determination device, a determination method, and a program, and relates to a technology suitable for determination of road rage by a vehicle.

2. Description of the Related Art

For example, in Japanese Patent Application Laid-open No. 2020-201753, there is disclosed a device which determines whether or not another vehicle is road-raging at an own vehicle. The device as described in Japanese Patent Application Laid-open No. 2020-201753 determines whether or not the another vehicle is road-raging at the own vehicle based on, for example, a duration and the number of times of a state in which an intervehicle distance between the own vehicle and the another vehicle is equal to or shorter than a predetermined distance.

The intervehicle distance between the own vehicle and the another vehicle may decrease in accordance with a state of a road on which the own vehicle and the another vehicle are traveling and the like even when a driver of the another vehicle does not intend to execute the road rage. Thus, when whether or not the road rage is executed is simply determined based on the intervehicle distance between the own vehicle and the another vehicle as in the device as described in Japanese Patent Application Laid-open No. 2020-201753, even a case in which the road rage is not actually executed by another vehicle may erroneously be determined as the road rage, and hence determination accuracy is considered to have room for improvement.

SUMMARY OF THE INVENTION

The present disclosure has been devised in order to solve the above-mentioned problem. That is, one object of the present disclosure is to effectively increase determination accuracy for road rage.

A device according to at least one embodiment of the present disclosure is a determination device (1) for determining whether a second vehicle (V2) traveling in front of a first vehicle (V1) is road-raging at the first vehicle (V1), the determination device (1) including: a close state determination unit (12) configured to determine whether the first vehicle (V1) and the second vehicle (V2) are in a predetermined close state; a third vehicle determination unit (11) configured to determine whether a third vehicle (V3) traveling in front of the second vehicle (V2) exists; and a road rage determination unit (16) configured to avoid determining that the road rage is being executed when at least one condition of a first condition that the close state determination unit (12) determines that the predetermined close state exists or a second condition that the third vehicle determination unit (11) determines that the third vehicle (V3) does not exist is not satisfied, and to determine that the road rage is being executed when the first condition and the second condition are satisfied.

A method according to at least one embodiment of the present disclosure is a determination method of determining whether a second vehicle (V2) traveling in front of a first vehicle (V1) is road-raging at the first vehicle (V1), the determination method including: determining whether the first vehicle (V1) and the second vehicle (V2) are in a predetermined close state; determining whether a third vehicle (V3) traveling in front of the second vehicle (V2) exists; and avoiding determining that the road rage is being executed when at least one condition of a first condition that the predetermined close state is determined to exist or a second condition that the third vehicle (V3) is determined not to exist is not satisfied, and determining that the road rage is being executed when the first condition and the second condition are satisfied.

A program according to at least one embodiment of the present disclosure causes a computer (10) of a determination device (1) for determining whether a second vehicle (V2) traveling in front of a first vehicle (V1) is road-raging at the first vehicle (V1) to execute the processes of: determining whether the first vehicle (V1) and the second vehicle (V2) are in a predetermined close state; determining whether a third vehicle (V3) traveling in front of the second vehicle (V2) exists; and avoiding determining that the road rage is being executed when at least one condition of a first condition that the predetermined close state is determined to exist or a second condition that the third vehicle (V3) is determined not to exist is not satisfied, and determining that the road rage is being executed when the first condition and the second condition are satisfied.

With the above-mentioned configuration, it is determined whether the road rage is being executed in consideration of not only the close state between the first vehicle (V1) and the second vehicle (V2), but also the existence of the third vehicle (V3) traveling in front of the second vehicle (V2), thereby being capable of effectively increasing the determination accuracy compared with a determination method of the related art based on only an intervehicle distance.

In another aspect of the present disclosure, the close state determination unit (12) is configured to determine that the predetermined close state exists in one of a case in which a time during which an intervehicle distance (D) is equal to or shorter than a predetermined threshold distance (D1) continues for a predetermined first threshold time (T1) or longer or a case in which the number of times of occurrence of the intervehicle distance (D) being equal to or shorter than the predetermined threshold distance (D1) reaches a predetermined threshold number of times (N1) within a predetermined second threshold time (T2).

According to this aspect, it is possible to effectively determine that the first vehicle (V1) and the second vehicle (V2) are in the close state.

In another aspect of the present disclosure, the close state determination unit (12) is configured to determine that the predetermined close state exists when the number of times (Nb) of deceleration of the second vehicle (V2) reaches a predetermined number of times (Nb1) within a predetermined time (T3).

According to this aspect, the road rage which cannot be detected by the determination method based on only the intervehicle distance (D) can be effectively detected by determining whether the road rage is being executed in consideration of the deceleration frequency of the second vehicle (V2), thereby being capable of reliably increasing the determination accuracy.

In another aspect of the present disclosure, the close state determination unit (12) is configured to acquire the number of times of flashing of a brake lamp of the second vehicle (V2), and to set the acquired number of times of flashing as the number of times (Nb) of deceleration of the second vehicle (V2).

According to this aspect, it is possible to accurately recognize the number of times (Nb) of deceleration of the second vehicle (V2) by acquiring the number of times of flashing of the brake lamp of the second vehicle (V2).

In another aspect of the present disclosure, in a case in which the first condition and the second conditions are satisfied, and a minimum speed set to a road on which the first vehicle (V1) and the second vehicle (V2) are traveling is acquired, the road rage determination unit (16) is configured to avoid determining that the road rage is being executed when a vehicle speed (v) of one of the first vehicle (V1) or the second vehicle (V2) is equal to or higher than the minimum speed, and to determine that the road rage is being executed when the vehicle speed (v) of one of the first vehicle (V1) or the second vehicle (V2) falls below the minimum speed.

According to this aspect, under the state in which the third vehicle (V3) does not exist, when the first vehicle (V1) and the second vehicle (V2) are in the close state and the vehicle speed (v) of the first vehicle (V1) or the second vehicle (V2) falls below the minimum speed, it is determined that the road rage is being executed. As a result, it is possible to appropriately detect a state in which the second vehicle (V2) is intentionally hindering the travel of the first vehicle (V1), thereby being capable of reliably increasing the determination accuracy for the road rage.

In another aspect of the present disclosure, in a case in which at least one of the first vehicle (V1) or the second vehicle (V2) has stopped under a state in which a degree of mutual closeness is high after the first condition and the second condition are satisfied, the road rage determination unit (16) is configured to avoid determining that the road rage is being executed when a place of the stop is outside a no-parking and no-stopping section, and to determine that the road rage is being executed when the place of the stop is inside the no-parking and no-stopping section.

According to this aspect, under the state in which the third vehicle (V3) does not exist, when the first vehicle (V1) and the second vehicle (V2) are close to each other and at least one of the first vehicle (V1) or the second vehicle (V2) has stopped in the no-parking and no-stopping section, it is determined that the road rage is being executed. As a result, it is possible to appropriately detect a state in which the second vehicle (V2) is intentionally hindering the travel of the first vehicle (V1) to forcefully stop the first vehicle (V1), thereby being capable of reliably increasing the determination accuracy for the road rage.

Another device according to at least one embodiment of the present disclosure is a determination device (1) for determining whether a second vehicle (V2) traveling in front of a first vehicle (V1) is road-raging at the first vehicle (V1), the determination device (1) including: a close state determination unit (12) configured to determine that the first vehicle (V1) and the second vehicle (V2) are in a predetermined close state when the number of times of deceleration of the second vehicle (V2) reaches a predetermined number of times within a predetermined time; and a road rage determination unit (16) configured to determine that the road rage is being executed when the close state determination unit (12) determines that the predetermined close state exists.

According to this aspect, the road rage which cannot be detected by the determination method based on only the intervehicle distance can be effectively detected by determining whether the road rage is being executed based on the deceleration frequency of the second vehicle (V2), thereby being capable of reliably increasing the determination accuracy.

In order to facilitate the understanding of the invention, in the above description, the constituent elements of the invention corresponding to at least one embodiment of the present disclosure are suffixed in parentheses with reference symbols used in the at least one embodiment. However, the constituent elements of the invention are not intended to be limited to those in the at least one embodiment as defined by the reference symbols.

DESCRIPTION OF THE EMBODIMENTS

Description is now given of a determination device, a determination method, and a program according to at least one embodiment of the present disclosure with reference to the drawings. Like components are denoted by like reference symbols and the same applies to the names and functions of those components. Therefore, a detailed description of those components is not repeated.

[Overall Configuration]

Figure 1:
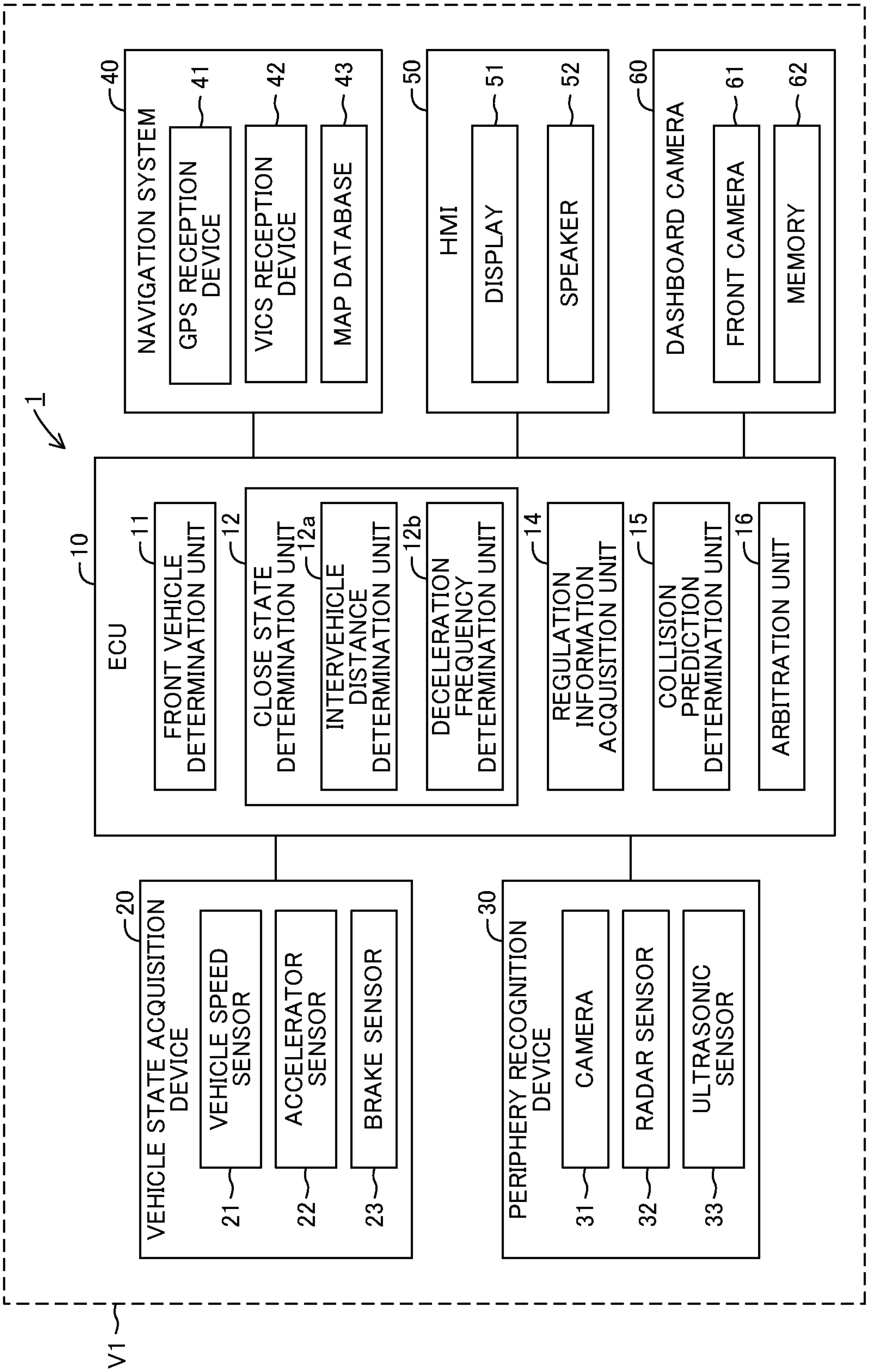
FIG. 1 is a schematic overall configuration diagram of a determination device according to at least one embodiment of the present disclosure.

FIG. 1 is a schematic overall configuration diagram of a determination device 1 according to the at least one embodiment. The determination device 1 is mounted to a vehicle V1. The vehicle V1 to which the determination device 1 is mounted is hereinafter referred to as "own vehicle" to distinguish the vehicle V1 from other vehicles.

The determination device 1 of FIG. 1 determines whether or not another vehicle is road-raging at the own vehicle V1. In the at least one embodiment, the "road rage" refers to dangerous driving in which another vehicle traveling in front of the own vehicle V1 intentionally hinders the travel of the own vehicle V1, or tries to forcefully stop the traveling own vehicle V1.

The determination device 1 includes an ECU 10. The ECU 10 includes a microcomputer as a main component. The term "ECU" is an abbreviation for "electronic control unit." The microcomputer includes a CPU, a ROM, a RAM, and an interface, for example, and the CPU implements various functions by executing instructions (programs, or routines) stored in the ROM.

The ECU 10 is a control device serving as a center of road rage determination processing of determining whether or not another vehicle traveling in front of the own vehicle V1 is road-raging at the own vehicle V1. Thus, a vehicle state acquisition device 20, a periphery recognition device 30, a navigation system 40, a human machine interface (HMI) 50, a dashboard camera 60, and the like are connected to the ECU 10 for communication.

The vehicle state acquisition device 20 is sensors which acquire states of the own vehicle V1. Specifically, the vehicle state acquisition device 20 includes a vehicle speed sensor 21, an accelerator sensor 22, a brake sensor 23, and the like.

The vehicle speed sensor 21 detects a travel speed of the own vehicle V1 (vehicle speed "v"), and transmits the detected vehicle speed "v" to the ECU 10. The vehicle speed sensor 21 may be a wheel speed sensor. The accelerator sensor 22 detects an operation amount of an accelerator pedal (not shown) by a driver, and transmits the detected accelerator operation amount to the ECU 10. The brake sensor 23 detects an operation amount of a brake pedal (not shown) by the driver, and transmits the detected brake operation amount to the ECU 10.

The periphery recognition device 30 is sensors which acquire target information on targets around the own vehicle V1. Specifically, the periphery recognition device 30 includes a camera 31, a radar sensor 32, an ultrasonic sensor 33, and the like. The target information on the targets around the own vehicle V1 acquired by the periphery recognition device 30 is transmitted to the ECU 10.

The camera 31 is arranged on, for example, a top portion of a front windshield glass of the own vehicle V1. The camera 31 is, for example, a stereo camera or a monocular camera, and a digital camera having an image pickup element such as a CMOS or a CCD can be used. The camera 31 captures a region in front of the own vehicle V1, and processes captured image data, to thereby acquire the target information on the region in front of the own vehicle V1. The target information is information indicating a type of the target detected in front of the own vehicle V1, a relative distance between the own vehicle V1 and the target, a relative speed between the own vehicle V1 and the target, and the like. It is only required to recognize the type of the target through, for example, machine learning such as pattern matching. In the at least one embodiment, the camera 31 acquires, as target information, in particular, a preceding vehicle traveling in front of the own vehicle V1, a further-preceding vehicle traveling in front of the preceding vehicle, a turning-on state of brake lamps of the preceding vehicle, and the like.

The radar sensor 32 is provided in, for example, a front end portion of the own vehicle V1, and detects a target existing in a region in front of the own vehicle V1. The radar sensor 32 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires the relative distance between the own vehicle V1 and the target, the relative speed between the own vehicle V1 and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the own vehicle V1, the relative distance between the own vehicle V1 and the target, the relative speed between the own vehicle V1 and the target, and the like. In the at least one embodiment, the radar sensor 32 acquires, as the target information, in particular, a relative distance (intervehicle distance) to the preceding vehicle traveling in front of the own vehicle V1.

The ultrasonic sensor 33 transmits an ultrasonic wave in a pulse form within a predetermined range in a periphery of the own vehicle V1, and receives a reflected wave reflected by a three-dimensional object. The ultrasonic sensor 33 acquires target information indicating a reflected point being a point on the three-dimensional object on which the transmitted ultrasonic wave is reflected, a distance from the ultrasonic sensor 33, and the like based on a time from the transmission to the reception of the ultrasonic wave. In the at least one embodiment, the ultrasonic sensor 33 acquires, as the target information, in particular, the relative distance (intervehicle distance) to the preceding vehicle traveling in front of the own vehicle V1.

The navigation system 40 includes a global positioning system (GPS) reception device 41. The GPS reception device 41 receives GPS signals from a plurality of artificial satellites, and acquires a current position (latitude and longitude) of the own vehicle V1 based on the received plurality of GPS signals. The GPS reception device 41 transmits the acquired current position of the own vehicle V1 to the ECU 10. Moreover, the navigation system 40 includes a VICS reception device 42 which acquires congestion information on roads, regulation information on roads due to construction or an accident, and the like transmitted from the vehicle information and communication system (VICS). Moreover, the navigation system 40 stores a map database 43. The map database 43 is a database which stores highly precise map information. The map information includes position information on roads and types of roads (for example, general road and expressway). Moreover, the map information includes information on signs (for example, no-parking and no-stopping section and legal speed limit) installed on the roads. The map database 43 may be provided in an information processing device installed at a facility (for example, a control center) which can communicate to and from the own vehicle V1.

The HMI 150 is an interface to be used to input and output information between a driver of the own vehicle V1 and the ECU 10, and includes an input device, an output device, and the like. Examples of the input device include a touch panel, a switch, and a speech recognition microphone. Examples of the output device include a display 51 and a speaker 52. The display 51 is, for example, a multi-information display, a head-up display, or a display of the navigation system 40. The speaker 52 is, for example, a speaker of a sound system or a speaker of the navigation system 40.

The dashboard camera 60 includes a front camera 61, a memory 62, and the like. The front camera 61 is mounted on a cabin side of a front windshield glass (not shown) of the own vehicle V1, and captures a front image of the own vehicle V1. The front camera 61 may be a camera also used as the camera 31 of the periphery recognition device 30. The memory 62 records image data captured by the front camera 61. The dashboard camera 60 may be a dashboard camera of a continuous recording type which successively stores the image data captured by the front camera 61 in the memory 62 and suitably overwrites the image data successively from the oldest image data in accordance with a storage capacity of the memory 62, an event-driven record type which, when a predetermined event occurs in the own vehicle V1, records the image data captured by the front camera 61 in a predetermined period before and after the occurrence of the event in the memory 62, or a hybrid type which has a recording area of the memory 62 divided into a continuous recording area and an event-driven recording area and reduces resolution of the image for the continuous recording, to thereby achieve the features of both of the continuous recording type and the event-driven recording type.

[Road Rage Determination Processing]

Description is now given of road rage determination processing. When functions of the ECU 10 are focused on, the ECU 10 includes a front vehicle determination unit 11, a close state determination unit 12, a regulation information acquisition unit 14, a collision prediction determination unit 15, and an arbitration unit 16 as a part of functional elements. Those functional elements are included in the ECU 10 which is integrated hardware in this description, but any part thereof may be provided to an ECU independent of the ECU 10. Moreover, all or a part of the functional elements of the ECU 10 may be provided in an information processing device installed at a facility (for example, the control center) which can communicate to and from the own vehicle V1.

Figure 2:
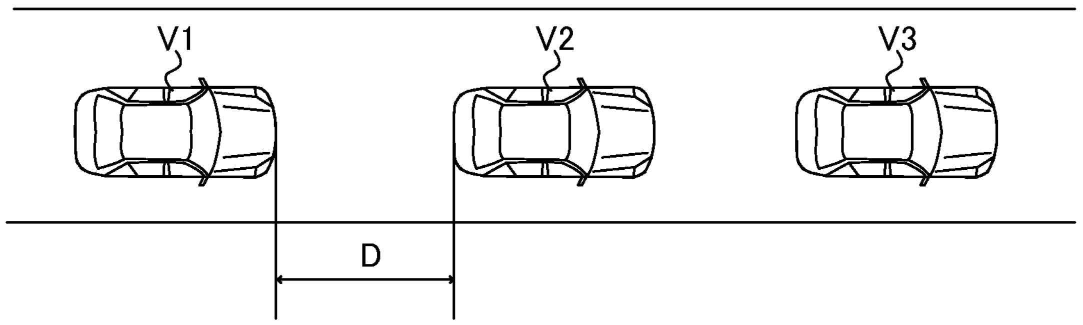
FIG. 2 is a diagram for illustrating a relationship among an own vehicle, a preceding vehicle, and a further-preceding vehicle.

The front vehicle determination unit 11 determines whether or not a preceding vehicle traveling in front of the own vehicle V1 exists based on a detection result obtained by the periphery recognition device 30, and, when a preceding vehicle is determined to exist, determines whether or not a further-preceding vehicle traveling in front of the preceding vehicle exists. In this case, the "preceding vehicle" refers to a vehicle V2 which is traveling immediately in front of the own vehicle V1 among other vehicles traveling on the same lane as that of the own vehicle V1, as illustrated in FIG. 2. Moreover, the "further-preceding vehicle" refers to a vehicle V3 which is traveling immediately in front of the preceding vehicle V2 among the other vehicles traveling on the same lane as that of the own vehicle V1 and the preceding vehicle V2. The existence of the preceding vehicle V2 and the further-preceding vehicle V3 can be acquired based on the detection results obtained by the camera 31 and the radar sensor 32 of the periphery recognition device 30 and the like through use of a publicly known method. It is only required that the front vehicle determination unit 11 be able to determine whether or not the preceding vehicle V2 and the further-preceding vehicle V3 exist, and the front vehicle determination unit 11 is not required to further acquire relative distances and relative speeds with respect to the own vehicle V1. The determination result obtained by the front vehicle determination unit 11 is transmitted to the arbitration unit 16.

The close state determination unit 12 includes an intervehicle distance determination unit 12*a* and a deceleration frequency determination unit 12*b*, and determines whether or not the own vehicle V1 and the preceding vehicle V2 are in a predetermined close state based on the determination results obtained by the determination units 12*a* and 12*b*.

The intervehicle distance determination unit 12*a* determines, based on the detection result obtained by the periphery recognition device 30, whether or not an intervehicle distance D between the own vehicle V1 and the preceding vehicle V2 is in a predetermined reduced state in which the intervehicle distance D is reduced. Specifically, the intervehicle distance determination unit 12*a* determines that the intervehicle distance D between the own vehicle V1 and the preceding vehicle V2 acquired by the periphery recognition device 30 is in the predetermined reduced state when a time during which the intervehicle distance D between the own vehicle V1 and the preceding vehicle V2 is equal to or shorter than a predetermined threshold distance D1 continues for a predetermined first threshold time T1 or longer. Moreover, the intervehicle distance determination unit 12*a* determines that the intervehicle distance D between the own vehicle V1 and the preceding vehicle V2 acquired by the periphery recognition device 30 is in the predetermined reduced state when a number of times N of the intervehicle distance D between the own vehicle V1 and the preceding vehicle V2 being equal to or shorter than the predetermined threshold distance D1 reaches a predetermined threshold number of times N1 within a predetermined a second threshold time T2. The threshold distance D1, the first threshold time T1, the threshold number of times N1, and the second threshold time T2 to be used for the determination may be fixed values, or may be variable values set in accordance with the vehicle speed "v" of the own vehicle V1 and the type (such as general road and expressway) of the road on which the own vehicle V1 is traveling. When the intervehicle distance determination unit 12*a* determines that the intervehicle distance D is in the predetermined reduced state, the close state determination unit 12 determines that the own vehicle V1 and the preceding vehicle V2 are in the predetermined close state, and transmits the determination result to the arbitration unit 16.

The deceleration frequency determination unit 12*b* determines whether or not a deceleration frequency of the preceding vehicle V2 is high based on the detection result obtained by the periphery recognition device 30. Specifically, the deceleration frequency determination unit 12*b* determines that the deceleration frequency of the preceding vehicle V2 is high when a number of times Nb of deceleration of the preceding vehicle V2 reaches a predetermined number of times Nb1 within a predetermined third threshold time T3. It is only required to count, for example, the number of times of flashing of brake lamps or a high mount stop lamp of the preceding vehicle V2 to obtain the number of times Nb of deceleration of the preceding vehicle V2. It is only required to acquire the flashing of the brake lamps and the high mount stop lamp by executing machine learning such as pattern matching based on image data of the brake lamps or the high mount stop lamp of the preceding vehicle V2 captured by the camera 31. The third threshold time T3 and the predetermined number of times Nb1 to be used for the determination may be fixed values, or may be variable values set in accordance with the vehicle speed "v" of the own vehicle V1 and the type (such as general road and expressway) of the road on which the own vehicle V1 is traveling. When the deceleration frequency determination unit 12*b* determines that the deceleration frequency of the preceding vehicle V2 is high, the close state determination unit 12 determines that the own vehicle V1 and the preceding vehicle V2 are in the predetermined close state, and transmits the determination result to the arbitration unit 16.

The regulation information acquisition unit 14 acquires regulation information on the road on which the own vehicle V1 is traveling. Specifically, the regulation information acquisition unit 14 acquires the type (such as general road and expressway) and sign information (such as no-parking and no-stopping section and legal minimum speed) of the road on which the own vehicle V1 is traveling based on the current position of the own vehicle V1 detected by the GPS reception device 41 of the navigation system 40 and the map information of the map database 43. Moreover, the regulation information acquisition unit 14 acquires the regulation information which indicates existence of a construction section or an accident vehicle in front of the own vehicle V1 on the road on which the own vehicle V1 is traveling based on the detection result obtained by the VICS reception device 42. Those pieces of information acquired by the regulation information acquisition unit 14 are transmitted to the arbitration unit 16.

The collision prediction determination unit 15 determines whether or not the own vehicle V1 is highly likely to collide with the preceding vehicle V2 based on a time-to-collision TTC being a predicted time to collision of the own vehicle V1 with the preceding vehicle V2. In this case, the time-to-collision TTC is obtained by dividing the intervehicle distance D between the own vehicle V1 and the preceding vehicle V2 at a certain time point by a relative speed vr (TTC=D/vr). It is only required to obtain the intervehicle distance D and the relative speed vr based on the detection result obtained by the periphery recognition device 30. The collision prediction determination unit 15 determines that the own vehicle V1 is highly likely to collide with the preceding vehicle V2 when the time-to-collision TTC decreases to a time equal to or shorter than a predetermined determination threshold value TTCv. The determination result obtained by the collision prediction determination unit 15 is transmitted to the arbitration unit 16.

The arbitration unit 16 determines whether or not the preceding vehicle V2 is road-raging at the own vehicle V1 based on the inputs from the front vehicle determination unit 11, the close state determination unit 12, the regulation information acquisition unit 14, and the collision prediction determination unit 15, and executes arbitration processing of controlling activation of the HMI 50 and the dashboard camera 60 based on the determination result. Description is now given of specific details of processing executed by the arbitration unit 16.

The arbitration unit 16 first determines whether or not a first condition being a prerequisite for the road rage is satisfied based on the input from the close state determination unit 12. When the close state determination unit 12 determines that the own vehicle V1 and the preceding vehicle V2 are in the predetermined close state, that is, the intervehicle distance between the own vehicle V1 and the preceding vehicle V2 is reduced, or the preceding vehicle V2 is frequently repeating the deceleration, the arbitration unit 16 determines that the first condition is satisfied. When the first condition is satisfied, the arbitration unit 16 determines whether or not a second condition being a prerequisite for the road rage is satisfied based on the input from the front vehicle determination unit 11. This second condition is satisfied when the further-preceding vehicle V3 does not exist. When the second condition is not satisfied, that is, the further-preceding vehicle V3 exists, the arbitration unit 16 does not determine that the road rage is being executed (or determines that the road rage is not being executed).

As described above, even in the case in which the intervehicle distance D between the own vehicle V1 and the preceding vehicle V2 is reduced, or the preceding vehicle V2 is frequently repeating deceleration, when the further-preceding vehicle V3 exists, it is not determined that the road rage is being executed. Accordingly, when a driver of the preceding vehicle V2 does not intend the road rage, for example, when the preceding vehicle V2 decelerates due to the influence of the further-preceding vehicle V3 caused by congestion, and the own vehicle V1 consequently approaches the preceding vehicle V2, it is possible to effectively prevent an erroneous determination of the road rage.

When the first condition and the second condition are satisfied, the arbitration unit 16 determines whether or not at least one of a third condition to a sixth condition described below is satisfied. When at least one of the third condition to the sixth condition is satisfied, the arbitration unit 16 determines that the preceding vehicle V2 is road-raging at the own vehicle V1. Meanwhile, none of the third condition to the sixth condition is satisfied, the arbitration unit 16 does not determine that the road rage is being executed (or determines that the road rage is not being executed). A detailed description is now given of the third condition to the sixth condition.

The third condition is satisfied when the own vehicle V1 is traveling on a vehicle-only road such as an expressway, the regulation information acquisition unit 14 acquires a legal minimum speed (hereinafter referred to as "minimum speed") set to the road on which the own vehicle V1 is traveling, and the vehicle speed "v" of the own vehicle V1 acquired by the vehicle speed sensor 21 falls below the minimum speed. When the further-preceding vehicle V3 does not exist, but the intervehicle distance D between the own vehicle V1 and the preceding vehicle V2 is reduced, or the preceding vehicle V2 frequently repeats the deceleration, and the vehicle speed "v" of the own vehicle V1 falls below the minimum speed, it is assumed that the driver of the preceding vehicle V2 is intentionally hindering the travel of the own vehicle V1.

The arbitration unit 16 determines that the preceding vehicle V2 is road-raging at the own vehicle V1 when the first condition and the second condition are satisfied, and the third condition is satisfied. That is, under the state in which the further-preceding vehicle V3 does not exist, when the intervehicle distance D between the own vehicle V1 and the preceding vehicle V2 is reduced, or the preceding vehicle V2 frequently repeats the deceleration, and the vehicle speed "v" of the own vehicle V1 falls below the minimum speed, the arbitration unit 16 determines that the preceding vehicle V2 is road-raging at the own vehicle V1. As described above, the road rage is determined in consideration of not only the close state, but also the existence of the further-preceding vehicle V3, and further, the minimum speed, and hence it is possible to reliably increase the determination accuracy for the road rage compared with a related-art determination method based on only the intervehicle distance.

The fourth condition is satisfied when the regulation information acquisition unit 14 does not acquire the regulation information which indicates the existence of a construction section or an accident vehicle in front of the own vehicle V1 on the road on which the own vehicle V1 is traveling. Under the state in which the further-preceding vehicle V3 does not exist, when the intervehicle distance D between the own vehicle V1 and the preceding vehicle V2 is reduced, or the preceding vehicle V2 frequently repeats the deceleration, but a construction section or an accident vehicle exists on the road on which the own vehicle V1 is traveling, it is considered that, for example, the preceding vehicle V2 stops before the accident vehicle, or decelerates to travel in the construction section, and does not thus intend the road rage. Meanwhile, when the further-preceding vehicle V3 does not exist, and none of a construction section and an accident vehicle exists on the road on which the own vehicle V1 is traveling, but the intervehicle distance D between the own vehicle V1 and the preceding vehicle V2 is reduced, or the preceding vehicle V2 frequently repeats the deceleration, it is assumed that the driver of the preceding vehicle V2 is intentionally hindering the travel of the own vehicle V1.

The arbitration unit 16 determines that the preceding vehicle V2 is road-raging at the own vehicle V1 when the first condition and the second condition are satisfied, and the fourth condition is satisfied. That is, under the state in which the further-preceding vehicle V3 does not exist, when the intervehicle distance D between the own vehicle V1 and the preceding vehicle V2 is reduced, or the preceding vehicle V2 frequently repeats the deceleration, and none of a construction section and an accident vehicle exists on the road on which the own vehicle V1 is traveling, the arbitration unit 16 determines that the preceding vehicle V2 is road-raging at the own vehicle V1. As described above, the road rage is determined in consideration of not only the close state, but also the existence of the further-preceding vehicle V3, and further, the regulation information, such as an accident vehicle and a construction section, and hence it is possible to reliably increase the determination accuracy for the road rage compared with the related-art determination method based on only the intervehicle distance.

The fifth condition is satisfied when the regulation information acquisition unit 14 acquires such regulation information that the road on which the own vehicle V1 is traveling is in a no-parking and no-stopping section, the intervehicle distance D between the own vehicle V1 and the preceding vehicle V2 is equal to or shorter than a predetermined distance, and a degree of closeness is thus high, and at least one of the own vehicle V1 or the preceding vehicle V2 has stopped in the no-parking and no-stopping section. Even when the own vehicle V1 or the preceding vehicle V2 are close to each other and stop, in a case in which a place of the stop is not in the no-parking and no-stopping section, this case is considered to be, for example, a case in which the drivers of the own vehicle V1 and the preceding vehicle V2 know each other, and intentionally stop at roadside or the like. Meanwhile, when the further-preceding vehicle V3 does not exist, the intervehicle distance D between the own vehicle V1 and the preceding vehicle V2 is reduced, or the preceding vehicle V2 frequently repeats the deceleration, and at least one of the own vehicle V1 or the preceding vehicle V2 stops in the no-parking and no-stopping section while the own vehicle V1 and the preceding vehicle V2 are close to each other, it is assumed that the driver of the preceding vehicle V2 intentionally hinders the travel of the own vehicle V1, and tries to forcefully stop the own vehicle V1.

The arbitration unit 16 determines that the preceding vehicle V2 is road-raging at the own vehicle V1 when the first condition and the second condition are satisfied, and the fifth condition is satisfied. That is, under the state in which the further-preceding vehicle V3 does not exist, after the intervehicle distance D between the own vehicle V1 and the preceding vehicle V2 is reduced, or the preceding vehicle V2 frequently repeats the deceleration, when at least one of the own vehicle V1 or the preceding vehicle V2 has stopped in the no-parking and no-stopping section under a state in which the degree of closeness is high, the arbitration unit 16 determines that the preceding vehicle V2 is road-raging at the own vehicle V1. As described above, the road rage is determined in consideration of not only the close state, but also the existence of the further-preceding vehicle V3, and further, the sign information (no-parking and no-stopping section) on the road on which the preceding vehicle V2 and the own vehicle V1 have stopped and the like, and hence it is possible to reliably increase the determination accuracy compared with the related-art determination method based on only the intervehicle distance.

The sixth condition is satisfied when the regulation information acquisition unit 14 acquires such regulation information that the road on which the own vehicle V1 is traveling is in a no-parking and no-stopping section, the collision prediction determination unit 15 determines that the preceding vehicle V2 and the own vehicle V1 are highly likely to collide with each other, and at least one of the own vehicle V1 or the preceding vehicle V2 has stopped in the no-parking and no-stopping section. When the further-preceding vehicle V3 does not exist, but after the intervehicle distance D between the own vehicle V1 and the preceding vehicle V2 is reduced, or the preceding vehicle V2 frequently repeats the deceleration, at least one of the own vehicle V1 or the preceding vehicle V2 stops in the no-parking and no-stopping section under the state in which the degree of closeness is high, and the time to collision TTC is thus equal to or shorter than the determination threshold value TTCv, it is assumed that the driver of the preceding vehicle V2 tried to forcefully stop the own vehicle V1 in spite of a risk of collision.

The arbitration unit 16 determines that the preceding vehicle V2 is road-raging at the own vehicle V1 when the first condition and the second condition are satisfied, and the sixth condition is satisfied. That is, under the state in which the further-preceding vehicle V3 does not exist, after the intervehicle distance D between the own vehicle V1 and the preceding vehicle V2 is reduced, or the preceding vehicle V2 frequently repeats the deceleration, when at least one of the own vehicle V1 or the preceding vehicle V2 has stopped in the no-parking and no-stopping section under the state in which the degree of closeness is high, and the time to collision TTC is thus equal to or shorter than the determination threshold value TTCv, the arbitration unit 16 determines that the preceding vehicle V2 is road-raging at the own vehicle V1. As described above, the road rage is determined in consideration of not only the close state, but also the existence of the further-preceding vehicle V3, and further, the sign information (no-parking and no-stopping section) on the road on which the preceding vehicle V2 has stopped and the time to collision TTC, and hence it is possible to reliably increase the determination accuracy compared with the related-art determination method based on only the intervehicle distance.

When the first condition and the second condition are satisfied, and at least one of the third condition to the six condition is satisfied, the arbitration unit 16 determines that the preceding vehicle V2 is road-raging at the own vehicle V1, and activates the HMI 50 and the dashboard camera 60.

Specifically, when the arbitration unit 16 determines that the preceding vehicle V2 is road-raging, the arbitration unit 16 displays, on the display 51, an image for notifying the driver of the own vehicle V1 of the road rage by the preceding vehicle V2. Moreover, the arbitration unit 16 displays, on the display 51, an image for confirming whether or not the driver reports to an external organization such as the police simultaneously with the notification to the driver. For such notification and confirmation for the driver, sound of the speaker 52 may simultaneously be used, or only the sound of the speaker 52 may be used. The report to the external organization may be executed by the input device (touch panel, switch, or the like) of the HMI 50 receiving an input operation of the driver, or the speech recognition microphone receiving a speech of the driver. The report to the external organization may be configured such that the confirmation by the driver is skipped, and the report is made simultaneously with the determination of the road rage by the arbitration unit 16.

In a case in which the fifth condition or the six condition that the own vehicle V1 is stopped by the preceding vehicle V2 is satisfied and the arbitration unit 16 thus determines that the preceding vehicle V2 is road-raging, when doors of the own vehicle V1 are unlocked, the arbitration unit 16 displays, on the display 51, an image for confirming whether or not to lock the doors or an image for urging the driver to lock the doors in order to secure safety of the driver. For this processing, the sound of the speaker 52 may simultaneously be used, or only the sound of the speaker 52 may be used. When the arbitration unit 16 displays, on the display 51, the image for confirming whether or not the doors are locked, and then receives an instruction to lock the doors from the driver, the arbitration unit 16 automatically brings the doors of the own vehicle V1 into the locked state. It is only required to receive the lock instruction from the driver through the input device (such as a touch panel) of the HMI 50 or the speech recognition microphone.

When the arbitration unit 16 determines that the preceding vehicle V2 is road-raging, the arbitration unit 16 causes the dashboard camera 60 to record the road rage of the preceding vehicle V2. Specifically, the arbitration unit 16 stores in the memory 62, as overwrite prohibition data, the image data captured by the front camera 61 over a predetermined time from before to after a time at which the road rage is determined. The predetermined time from before to after the determination of the road rage may be a fixed time set in advance or a variable time. When the predetermined time is the variable time, it is only required to set, as the predetermined time from before to after the determination of the road rage, for example, a time from when the arbitration unit 16 detects a sign of the road rage to a time when the arbitration unit 16 determines that the road rage ends. Regarding the determination of whether or not the sign of the road rage exists, it is only required to determine that the sign of the road rage exists when, for example, the above-mentioned first condition and second condition are satisfied. Moreover, regarding whether or not the road rage ends, it is only required to determine that the road rage ends when the preceding vehicle V2 gets apart from the own vehicle V1 by a predetermined distance or more.

Figure 3:
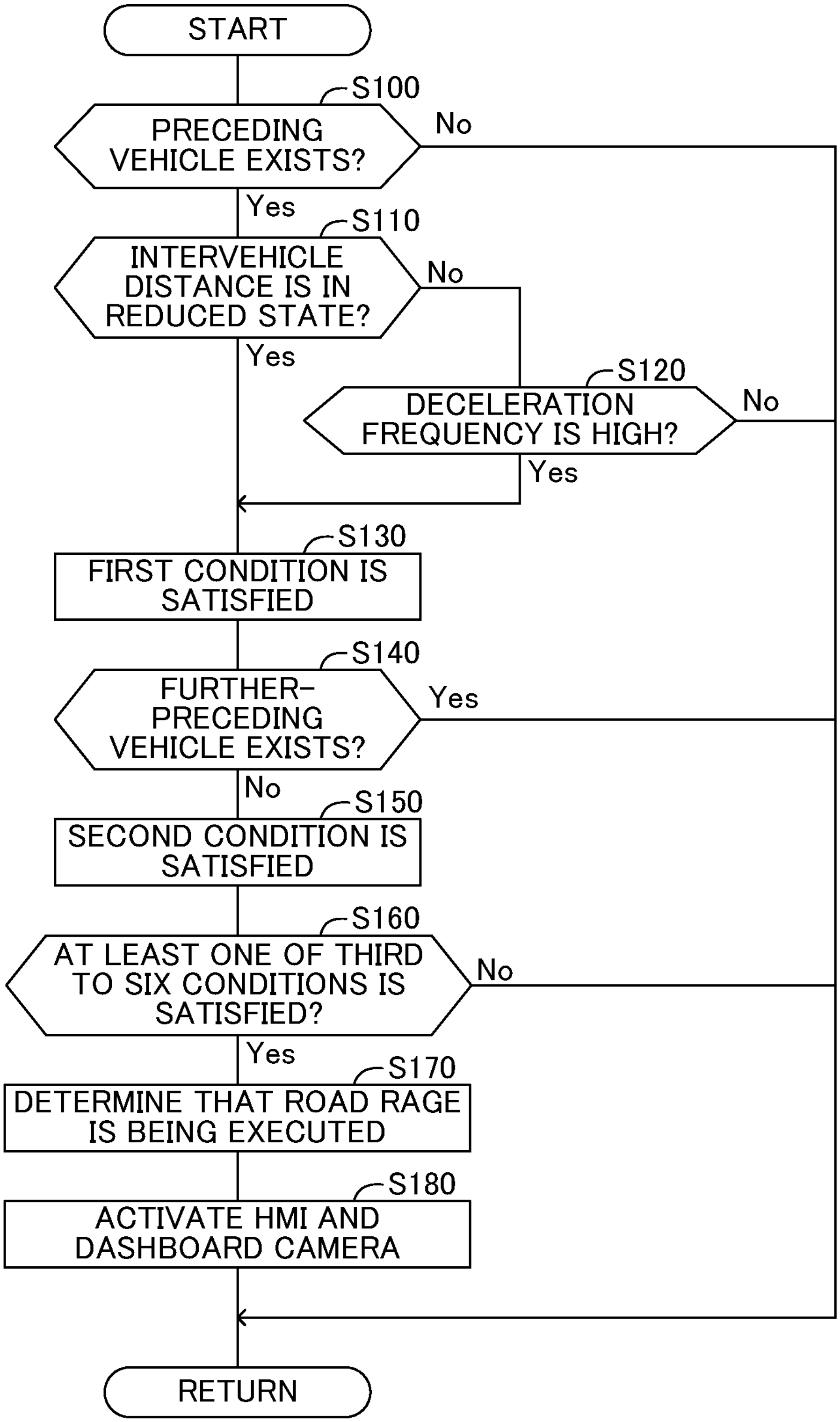
FIG. 3 is a flowchart for illustrating a routine of road rage determination processing in the at least one embodiment.

Next, referring to a flowchart of FIG. 3, description is now given of a routine of road rage determination processing executed by the ECU 10. This routine is started when, for example, the own vehicle V1 travels.

In Step S100, the ECU 10 determines whether or not the preceding vehicle V2 exists in front of the own vehicle V1. When the preceding vehicle V2 exists in front of the own vehicle V1 (Yes), the ECU 10 advances its process to Step S110. Meanwhile, when the preceding vehicle V2 does not exist in front of the own vehicle V1 (No), the ECU 10 temporarily finishes (returns from) this routine.

In Step S110, the ECU 10 determines whether or not the intervehicle distance D between the own vehicle V1 and the preceding vehicle V2 is in the predetermined reduced state. When the time during which the intervehicle distance D between the own vehicle V1 and the preceding vehicle V2 is equal to or shorter than the predetermined threshold distance D1 continues for the predetermined first threshold time T1 or longer or when the number of times of occurrence N of the intervehicle distance D between the own vehicle V1 and the preceding vehicle V2 being equal to or shorter than the predetermined threshold distance D1 reaches the predetermined threshold number of times N1 within the predetermined second threshold time T2, the ECU 10 determines that the intervehicle distance D between the own vehicle V1 and the preceding vehicle V2 is in the predetermined reduced state. When the intervehicle distance D is in the predetermined reduced state (Yes), the ECU 10 determines that the own vehicle V1 and the preceding vehicle V2 are in the predetermined close state, and the ECU 10 advances its process to Step S130. Meanwhile, when the intervehicle distance D is not in the predetermined reduced state (No), the ECU 10 advances its process to Step S120.

In Step S120, the ECU 10 determines whether or not the deceleration frequency of the preceding vehicle V2 is high. When the number of times Nb of deceleration (for example, the number of times of flashing of the brake lamps) of the preceding vehicle V2 reaches the predetermined number of times Nb1 within the predetermined third threshold time T3, the ECU 10 determines that the deceleration frequency of the preceding vehicle V2 is high. When the ECU 10 determines that the deceleration frequency of the preceding vehicle V2 is high (Yes), the ECU 10 determines that the own vehicle V1 and the preceding vehicle V2 are in the predetermined close state, and the ECU 10 advances its process to Step S130. Meanwhile, when the ECU 10 determines that the deceleration frequency of the preceding vehicle V2 is not high (No), the ECU 10 temporarily finishes (returns from) this routine without determining that the road rage is being executed.

In Step S130, the ECU 10 determines that the first condition being the perquisite of the road rage is satisfied. After that, in Step S140, the ECU 10 determines whether or not the further-preceding vehicle V3 exists in front of the preceding vehicle V2. When the further-preceding vehicle V3 does not exist (No), the ECU 10 advances its process to Step S150. Meanwhile, when the further-preceding vehicle V3 exists (Yes), the ECU 10 temporarily finishes (returns from) this routine without determining that the road rage is being executed. That is, when the preceding vehicle V2 is decelerating due to the influence of the further-preceding vehicle V3 caused by congestion or the like, the ECU 10 does not determine that this case is the road rage. As a result, the erroneous determination can effectively be prevented, and inconvenience experienced by the driver can be reduced.

In Step S150, the ECU 10 determines that the second condition being the perquisite of the road rage is satisfied. After that, in Step S160, the ECU 10 determines whether or not at least one of the third condition to the sixth condition is satisfied. Specifically, the ECU 10 determines whether or not there is satisfied at least one or more of the third condition that the vehicle speed "v" of the own vehicle V1 falls below the minimum speed, the fourth condition that the regulation information which indicates the existence of a construction section or an accident vehicle in front of the own vehicle V1 on the road on which the own vehicle V1 is traveling is not acquired, the fifth condition that, under the state in which the intervehicle distance D between the own vehicle V1 and the preceding vehicle V2 is equal to or shorter than the predetermined distance, at least one of the own vehicle V1 or the preceding vehicle V2 has stopped in the no-parking and no-stopping section, and the sixth condition that, under the state in which the time-to-collision TTC is equal to or shorter than the determination threshold value TTCv, at least one of the own vehicle V1 or the preceding vehicle V2 has stopped in the no-parking and no-stopping section.

When none of the third condition to the sixth condition is satisfied (No), the ECU 10 temporarily finishes (returns from) this routine without determining that the road rage is being executed. Meanwhile, one or more conditions among the third condition to the six condition are satisfied (Yes), the ECU 10 advances its process to Step S170, and determines that the preceding vehicle V2 is road-raging at the own vehicle V1.

When it is determined that the road rage is being executed in Step S170, the ECU 10 advances its process to Step S180, and activates the HMI 150 and the dashboard camera 60. Specifically, the ECU 10 displays, on the display 51, the image for notifying the driver of the road rage by the preceding vehicle V2 and the image for confirming whether or not the driver reports to an external organization. When the fifth condition or the sixth condition is satisfied and thus the own vehicle V1 has stopped, and the doors of the own vehicle V1 are unlocked, the ECU 10 displays, on the display 51, the image for confirming whether or not the driver requires the lock of the doors or an image for urging the driver to lock the doors. For such notification and confirmation, the sound of the speaker 52 may simultaneously be used, or only the sound of the speaker 52 may be used. Moreover, the ECU 10 stores in the dashboard camera 60, as the overwrite prohibition data, the image data over the predetermined time from before to after the time at which the road rage of the preceding vehicle V2 is determined.

After the HMI 150 and the dashboard camera 60 are activated in Step S180, the ECU 10 finishes this routine.

According to the at least one embodiment described above in detail, there is provided the configuration in which, when the first condition that the own vehicle V1 and the preceding vehicle V2 are in the predetermined close state, but the second condition is not satisfied, that is, the further-preceding vehicle V3 exists, it is not determined that the road rage is being executed. As a result, when the preceding vehicle V2 is not actually road-raging, for example, when the preceding vehicle V2 decelerates due to the influence of the further-preceding vehicle V3 caused by congestion or the like, and the preceding vehicle V2 accordingly comes close to the own vehicle V1, it is possible to effectively prevent the erroneous determination of the road rage.

Moreover, in the case in which there are satisfied the first condition that the own vehicle 1 and the preceding vehicle V2 are in the predetermined close state and the second condition that the further-preceding vehicle V3 does not exist, when there is satisfied at least one or more of the third condition that the vehicle speed "v" of the own vehicle V1 falls below the minimum speed, the fourth condition that the regulation information which indicates the existence of a construction section or an accident vehicle in front of the own vehicle V1 on the road on which the own vehicle V1 is traveling is not acquired, the fifth condition that, under the state in which the intervehicle distance D between the own vehicle V1 and the preceding vehicle V2 is equal to or shorter than the predetermined distance, at least one of the own vehicle V1 or the preceding vehicle V2 has stopped in the no-parking and no-stopping section, and the sixth condition that, under the state in which the time-to-collision TTC is equal to or shorter than the determination threshold value TTCv, at least one of the own vehicle V1 or the preceding vehicle V2 has stopped in the no-parking and no-stopping section, it is determined that the preceding vehicle V2 is road-raging at the own vehicle V1.

That is, there is provided the configuration in which, under the state in which the further-preceding vehicle V3 does not exist, when the intervehicle distance D between the own vehicle V1 and the preceding vehicle V2 is reduced or the preceding vehicle V2 frequently repeats the deceleration, the road rage is determined in consideration of the sign information (minimum speed and no-parking and no-stopping section) and the regulation information (accident vehicle, construction section, and the like) on the road on which the own vehicle V1 is traveling. As a result, it is possible to effectively prevent the erroneous determination of the road rage, for example, when the preceding vehicle V2 decelerates in order to secure the safety, or the drivers of the preceding vehicle V2 and the own vehicle V1 intentionally stop at roadside, and it is thus possible to reliably increase the determination accuracy. Moreover, as a result of the prevention of the erroneous determination, the inconvenience experienced by the driver can effectively be reduced.

In the above, the determination device, the determination method, and the program according to the at least one embodiment have been described, but the present disclosure is not limited to the above-mentioned at least one embodiment, and various modifications are possible within the range not departing from the object of the present disclosure.

Modification Example 1

The processing step (Step S120 of FIG. 3) of determining whether or not the deceleration frequency of the preceding vehicle V2 is high may be omitted, and the first condition being the perquisite of the road rage may be determined to be satisfied when the intervehicle distance D between the own vehicle V1 and the preceding vehicle V2 is in the predetermined reduced state.

Figure 4:
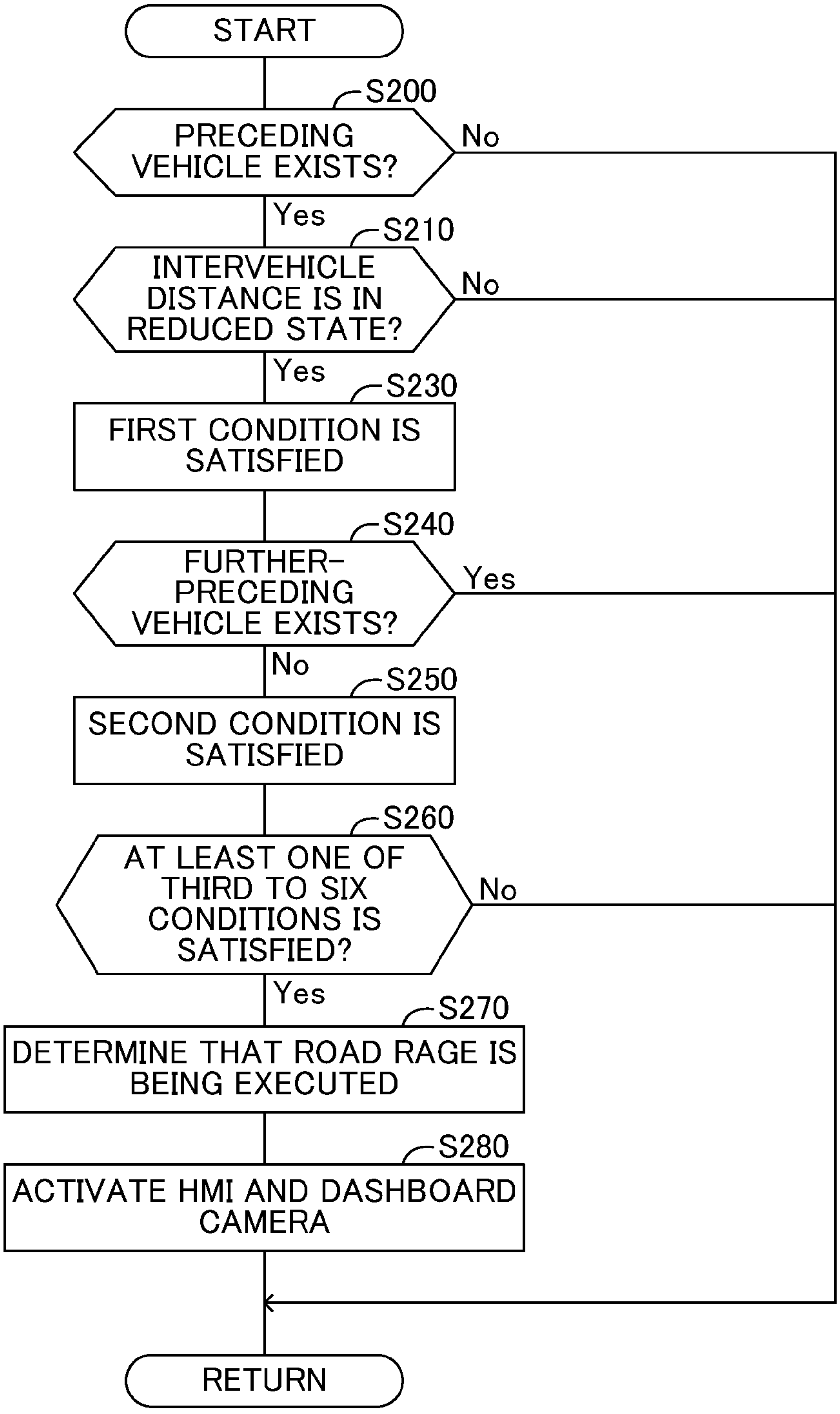
FIG. 4 is a flowchart for illustrating a routine of road rage determination processing in a modification example.

FIG. 4 is a flowchart for illustrating a routine of road rage determination processing executed by the ECU 10 in Modification Example 1. In Step S200, the ECU 10 determines whether or not the preceding vehicle V2 exists in front of the own vehicle V1. When the preceding vehicle V2 exists in front of the own vehicle V1 (Yes), the ECU 10 advances its process to Step S210. Meanwhile, when the preceding vehicle V2 does not exist in front of the own vehicle V1 (No), the ECU 10 temporarily finishes (returns from) this routine.

In Step S210, the ECU 10 determines whether or not the intervehicle distance D between the own vehicle V1 and the preceding vehicle V2 is in the predetermined reduced state. When the time during which the intervehicle distance D between the own vehicle V1 and the preceding vehicle V2 is equal to or shorter than the predetermined threshold distance D1 continues for the predetermined first threshold time T1 or longer or when the number of times of occurrence N of the intervehicle distance D between the own vehicle V1 and the preceding vehicle V2 being equal to or shorter than the predetermined threshold distance D1 reaches the predetermined threshold number of times N1 within the predetermined second threshold time T2, the ECU 10 determines that the intervehicle distance D between the own vehicle V1 and the preceding vehicle V2 is in the predetermined reduced state. When the intervehicle distance D is in the predetermined reduced state (Yes), the ECU 10 determines that the own vehicle V1 and the preceding vehicle V2 are in the predetermined close state, and the ECU 10 advances its process to Step S230. Meanwhile, when the intervehicle distance D is not in the predetermined reduced state (No), the ECU 10 temporarily finishes (returns from) this routine without determining that the road rage is being executed.

In Step S230, the ECU 10 determines that the first condition being the perquisite of the road rage is satisfied. After that, in Step S240, the ECU 10 determines whether or not the further-preceding vehicle V3 exists in front of the preceding vehicle V2. When the further-preceding vehicle V3 does not exist (No), the ECU 10 advances its process to Step S250. Meanwhile, when the further-preceding vehicle V3 exists (Yes), the ECU 10 temporarily finishes (returns from) this routine without determining that the road rage is being executed. That is, it is possible to effectively prevent the erroneous determination of the road rage when the preceding vehicle V2 is decelerating due to the influence of the further-preceding vehicle V3.

In Step S250, the ECU 10 determines that the second condition being the perquisite of the road rage is satisfied. After that, in Step S260, the ECU 10 determines whether or not at least one of the third condition to the sixth condition is satisfied. Specifically, the ECU 10 determines whether or not there is satisfied at least one or more of the third condition that the vehicle speed "v" of the own vehicle V1 falls below the minimum speed, the fourth condition that the regulation information which indicates the existence of a construction section or an accident vehicle in front of the own vehicle V1 on the road on which the own vehicle V1 is traveling is not acquired, the fifth condition that, under the state in which the intervehicle distance D between the own vehicle V1 and the preceding vehicle V2 is equal to or shorter than the predetermined distance, at least one of the own vehicle V1 or the preceding vehicle V2 has stopped in the no-parking and no-stopping section, and the sixth condition that, under the state in which the time-to-collision TTC is equal to or shorter than the determination threshold value TTCv, at least one of the own vehicle V1 or the preceding vehicle V2 has stopped in the no-parking and no-stopping section.

When none of the third condition to the sixth condition is satisfied (No), the ECU 10 temporarily finishes (returns from) this routine without determining that the road rage is being executed. Meanwhile, one or more conditions among the third condition to the six condition are satisfied (Yes), the ECU 10 advances its process to Step S270, and determines that the preceding vehicle V2 is road-raging at the own vehicle V1.

When it is determined that the road rage is being executed in Step S270, the ECU 10 advances its process to Step S280, and activates the HMI 150 and the dashboard camera 60. The processing step of activating the HMI 150 and the dashboard camera 60 is equivalent to the processing step of Step S180 in the at least one embodiment, and a detailed description thereof is thus omitted. After the HMI 50 and the dashboard camera 60 are activated in Step S280, the ECU 10 finishes this routine.

According to the above-mentioned Modification Example 1, under the state in which the further-preceding vehicle V3 does not exist, when the intervehicle distance D between the own vehicle V1 and the preceding vehicle V2 is in the predetermined reduced state, the road rage is determined in consideration of the sign information (minimum speed and no-parking and no-stopping section) and the regulation information (accident vehicle, construction section, and the like) on the road on which the own vehicle V1 is traveling. As a result, for example, it is possible to effectively prevent the erroneous determination of the road rage, for example, when the preceding vehicle V2 decelerates in order to secure the safety, or the drivers of the preceding vehicle V2 and the own vehicle V1 intentionally stop at roadside, and hence it is possible to reliably increase the determination accuracy compared with the related-art determination method based on only the intervehicle distance.

Modification Example 2

The determination processing for the third condition to the sixth condition (Step S160 of FIG. 3) may be omitted, and whether or not the preceding vehicle V2 is road-raging may be determined based on the satisfaction of the first condition that the own vehicle V1 and the preceding vehicle V2 are in the predetermined close state and the satisfaction of the second condition that the further-preceding vehicle V3 does not exist, to thereby simplify the determination processing.

Figure 5:
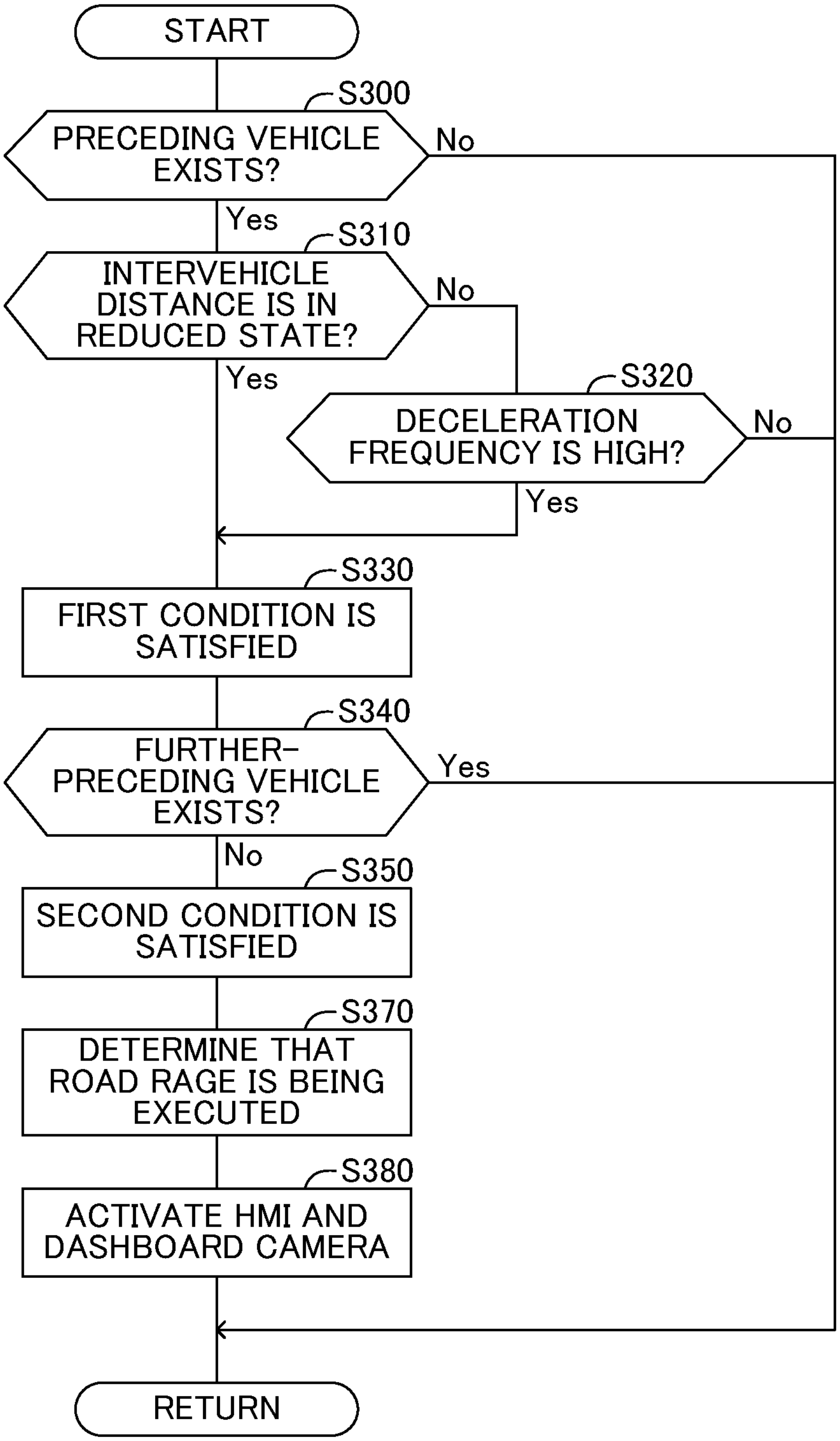
FIG. 5 is a flowchart for illustrating a routine of road rage determination processing in another modification example.

FIG. 5 is a flowchart for illustrating a routine of road rage determination processing executed by the ECU 10 in Modification Example 2. In Step S300, the ECU 10 determines whether or not the preceding vehicle V2 exists in front of the own vehicle V1. When the preceding vehicle V2 exists in front of the own vehicle V1 (Yes), the ECU 10 advances its process to Step S310. Meanwhile, when the preceding vehicle V2 does not exist in front of the own vehicle V1 (No), the ECU 10 temporarily finishes (returns from) this routine.

In Step S310, the ECU 10 determines whether or not the intervehicle distance D between the own vehicle V1 and the preceding vehicle V2 is in the predetermined reduced state. When the time during which the intervehicle distance D between the own vehicle V1 and the preceding vehicle V2 is equal to or shorter than the predetermined threshold distance D1 continues for the predetermined first threshold time T1 or longer or when the number of times of occurrence N of the intervehicle distance D between the own vehicle V1 and the preceding vehicle V2 being equal to or shorter than the predetermined threshold distance D1 reaches the predetermined threshold number of times N1 within the predetermined second threshold time T2, the ECU 10 determines that the intervehicle distance D between the own vehicle V1 and the preceding vehicle V2 is in the predetermined reduced state. When the intervehicle distance D is in the predetermined reduced state (Yes), the ECU 10 determines that the own vehicle V1 and the preceding vehicle V2 are in the predetermined close state, and the ECU 10 advances its process to Step S330. Meanwhile, when the intervehicle distance D is not in the predetermined reduced state (No), the ECU 10 advances its process to Step S320.

In Step S320, the ECU 10 determines whether or not the deceleration frequency of the preceding vehicle V2 is high. When the number of times Nb of deceleration (for example, the number of times of flashing of the brake lamps) of the preceding vehicle V2 reaches the predetermined number of times Nb1 within the predetermined third threshold time T3, the ECU 10 determines that the deceleration frequency of the preceding vehicle V2 is high. When the ECU 10 determines that the deceleration frequency of the preceding vehicle V2 is high (Yes), the ECU 10 advances its process to Step S330. Meanwhile, when the ECU 10 determines that the deceleration frequency of the preceding vehicle V2 is not high (No), the ECU 10 temporarily finishes (returns from) this routine without determining that the road rage is being executed.

In Step S330, the ECU 10 determines that the first condition is satisfied. After that, in Step S340, the ECU 10 determines whether or not the further-preceding vehicle V3 exists in the front of the preceding vehicle V2. When the further-preceding vehicle V3 does not exist (No), the ECU 10 advances its process to Step S350. Meanwhile, when the further-preceding vehicle V3 exists (Yes), the ECU 10 temporarily finishes (returns from) this routine without determining that the road rage is being executed.

In Step S350, the ECU 10 determines that the second condition is satisfied. After that, in Step S370, the ECU 10 determines whether or not the preceding vehicle V2 is road-raging at the own vehicle V1.

When it is determined that the road rage is being executed in Step S370, the ECU 10 advances its process to Step S380, and activates the HMI 150 and the dashboard camera 60. The processing step of activating the HMI 150 and the dashboard camera 60 is equivalent to the processing step of Step S180 in the at least one embodiment, and a detailed description thereof is thus omitted. After the HMI 50 and the dashboard camera 60 are activated in Step S380, the ECU 10 finishes this routine.

According to the above-mentioned Modification Example 2, when the intervehicle distance D between the own vehicle V1 and the preceding vehicle V2 is reduced, or the preceding vehicle V2 frequently repeats the deceleration, but the further-preceding vehicle V3 exists, it is not determined that the road rage is being executed. As a result, when the preceding vehicle V2 is not actually road-raging, for example, when the preceding vehicle V2 decelerates due to the deceleration of the further-preceding vehicle V3, and the preceding vehicle V2 accordingly comes close to the own vehicle V1, it is possible to effectively prevent the erroneous determination of the road rage, and hence it is possible to reliably increase the determination accuracy compared with the related-art determination method based on only the intervehicle distance.

Modification Example 3

The determination for the second condition to the sixth condition may be omitted, and whether or not the preceding vehicle V2 is road-raging may be determined based on the satisfaction of the first condition that the intervehicle distance D between the own vehicle V1 and the preceding vehicle V2 is reduced, or the preceding vehicle V2 frequently repeats the deceleration, to thereby further simplify the determination processing.

Figure 6:
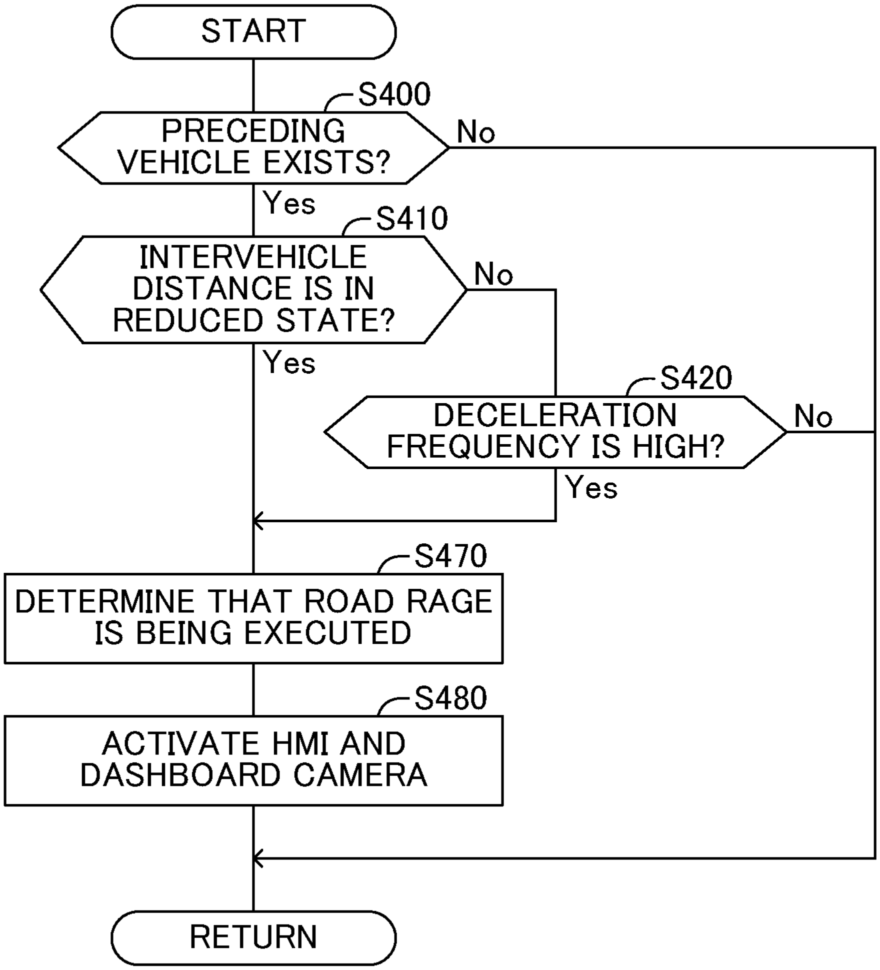
FIG. 6 is a flowchart for illustrating a routine of road rage determination processing in still another modification example.

FIG. 6 is a flowchart for illustrating a routine of road rage determination processing executed by the ECU 10 in Modification Example 3. In Step S400, the ECU 10 determines whether or not the preceding vehicle V2 exists in front of the own vehicle V1. When the preceding vehicle V2 exists in front of the own vehicle V1 (Yes), the ECU 10 advances its process to Step S410. Meanwhile, when the preceding vehicle V2 does not exist in front of the own vehicle V1 (No), the ECU 10 temporarily finishes (returns from) this routine.

In Step S410, the ECU 10 determines whether or not the intervehicle distance D between the own vehicle V1 and the preceding vehicle V2 is in the predetermined reduced state. When the time during which the intervehicle distance D between the own vehicle V1 and the preceding vehicle V2 is equal to or shorter than the predetermined threshold distance D1 continues for the predetermined first threshold time T1 or longer or when the number of times of occurrence N of the intervehicle distance D between the own vehicle V1 and the preceding vehicle V2 being equal to or shorter than the predetermined threshold distance D1 reaches the predetermined threshold number of times N1 within the predetermined second threshold time T2, the ECU 10 determines that the intervehicle distance D between the own vehicle V1 and the preceding vehicle V2 is in the predetermined reduced state. When the intervehicle distance D is in the predetermined reduced state (Yes), the ECU 10 determines that the own vehicle V1 and the preceding vehicle V2 are in the predetermined close state, and the ECU 10 advances its process to Step S470. Meanwhile, when the intervehicle distance D is not in the predetermined reduced state (No), the ECU 10 advances its process to Step S420.

In Step S420, the ECU 10 determines whether or not the deceleration frequency of the preceding vehicle V2 is high. When the number of times Nb of deceleration (for example, the number of times of flashing of the brake lamps) of the preceding vehicle V2 reaches the predetermined number of times Nb1 within the predetermined third threshold time T3, the ECU 10 determines that the deceleration frequency of the preceding vehicle V2 is high. When the ECU 10 determines that the deceleration frequency of the preceding vehicle V2 is high (Yes), the ECU 10 determines that the own vehicle V1 and the preceding vehicle V2 are in the predetermined close state, and the ECU 10 advances its process to Step S470. Meanwhile, when the ECU 10 determines that the deceleration frequency of the preceding vehicle V2 is not high (No), the ECU 10 temporarily finishes (returns from) this routine without determining that the road rage is being executed.

In Step S470, the ECU 10 determines that the preceding vehicle V2 is road-raging at the own vehicle V1. When it is determined that the road rage is being executed in Step S470, the ECU 10 advances its process to Step S480, and activates the HMI 150 and the dashboard camera 60. The processing step of activating the HMI 150 and the dashboard camera 60 is equivalent to the processing step of Step S180 in the at least one embodiment, and a detailed description thereof is thus omitted. After the HMI 50 and the dashboard camera 60 are activated in Step S480, the ECU 10 finishes this routine.

According to Modification Example 3, when the intervehicle distance D between the own vehicle V1 and the preceding vehicle V2 is not in the predetermined reduced state, but the preceding vehicle V2 frequently repeats the deceleration, it is determined that the preceding vehicle V2 is road-raging at the own vehicle V1. As a result, a behavior of hindering the travel of the own vehicle V1, such as intentional repetition of a brake operation at short intervals by the driver of the preceding vehicle V2, can be determined as the road rage, and hence it is possible to reliably increase the determination accuracy compared with the related-art determination method based on only the intervehicle distance.

OTHERS

In the at least one embodiment of the present disclosure, description is given while assuming that the determination device 1 is mounted to the own vehicle V1, but the determination device 1 may be mounted to the preceding vehicle V2. In this case, it is only required to provide such a configuration that the preceding vehicle V2 in the at least one embodiment is considered as an own vehicle, the own vehicle V1 is considered as a following vehicle, and it is determined whether or not the own vehicle V2 is road-raging at the following vehicle V1. It is only required to acquire the intervehicle distance between the own vehicle V2 and the following vehicle V1 and the like based on detection results obtained by a rear camera, a rear radar sensor, and the like mounted to the own vehicle V2. Moreover, it is only required to determine whether or not the deceleration frequency of the own vehicle V2 is high based on not the flashing of the brake lamps, but the number of times of stepping on a brake pedal acquired by a brake sensor. Moreover, when the road rage is determined to be executed, an image for notifying the driver of the own vehicle V2 of the execution of the road rage and an image for urging the driver to stop the road rage may be displayed on the display 51.

What is claimed is:

1. A determination device installed on a first vehicle for determining whether a second vehicle traveling in front of the first vehicle is road-raging at the first vehicle, the determination device comprising:

a memory storing one or more instructions; and a processor operatively coupled to the memory, wherein the one or more instructions, when executed by the processor, cause the determination device to:

determine whether the first vehicle and the second vehicle are in a predetermined close state, determine whether a third vehicle traveling in front of the second vehicle exists, avoid determining whether road rage occurs when at least one condition of a first condition that the predetermined close state exists or a second condition that that the third vehicle does not exist is not satisfied, determine that road rage occurs when the first condition and the second condition are satisfied, based on determining the first condition and the second condition are satisfied, and a legal minimum speed limit set to a road on which the first vehicle and the second vehicle are traveling is acquired, avoid determining whether road rage occurs when a vehicle speed of one of the first vehicle or the second vehicle is equal to or higher than the legal minimum speed limit, and determine that road rage occurs when the vehicle speed of one of the first vehicle or the second vehicle falls below the legal minimum speed limit, based on determining at least one of the first vehicle or the second vehicle has stopped under a state in which a degree of mutual closeness is high after the first condition and the second condition are satisfied, avoid determining whether road rage occurs when a place of the stop is outside a no-parking and no-stopping section, and determine that road rage occurs when the place of the stop is inside the no-parking and no-stopping section, and control a dashboard camera installed on the first vehicle to start recording based on determining that road rage occurs.

2. The determination device according to claim 1, wherein the one or more instructions, when executed by the processor, further cause the determination device to:

determine that the predetermined close state exists in one of a case in which a time during which an intervehicle distance is equal to or shorter than a predetermined threshold distance continues for a predetermined first threshold time or longer or a case in which a number of times of occurrence of the intervehicle distance being equal to or shorter than the predetermined threshold distance reaches a predetermined threshold number of times within a predetermined second threshold time.

3. The determination device according to claim 1, wherein the one or more instructions, when executed by the processor, further cause the determination device to:

determine that the predetermined close state exists when a number of times of deceleration of the second vehicle reaches a predetermined number of times within a predetermined time.

4. The determination device according to claim 3, wherein the one or more instructions, when executed by the processor, further cause the determination device to:

acquire a number of times of flashing of a brake lamp of the second vehicle, and to set the acquired number of times of flashing as the number of times of deceleration of the second vehicle.

5. A determination device installed on a first vehicle for determining whether a second vehicle traveling in front of the first vehicle is road-raging at the first vehicle, the determination device comprising:

a memory storing one or more instructions; and a processor operatively coupled to the memory, wherein the one or more instructions, when executed by the processor, cause the determination device to:

determine that the first vehicle and the second vehicle are in a predetermined close state when a number of times of deceleration of the second vehicle reaches a predetermined number of times within a predetermined time, determine that the road rage occurs when it is determined that the predetermined close state exists, based on determining the predetermined close state exists and a third vehicle traveling in front of the second vehicle exists, and a legal minimum speed limit set to a road on which the first vehicle and the second vehicle are traveling is acquired, avoid determining whether road rage occurs when a vehicle speed of one of the first vehicle or the second vehicle is equal to or higher than the legal minimum speed limit, and determine that road rage occurs when the vehicle speed of one of the first vehicle or the second vehicle falls below the legal minimum speed limit, based on determining at least one of the first vehicle or the second vehicle has stopped under a state in which a degree of mutual closeness is high after the it is determined that the predetermined close state exists and the third vehicle is traveling in front of the second vehicle, avoid determining whether road rage occurs when a place of the stop is outside a no-parking and no-stopping section, and determine that road rage occurs when the place of the stop is inside the no-parking and no-stopping section, control a dashboard camera installed on the first vehicle to start recording based on determining that road rage occurs.

6. The determination device according to claim 5, wherein the one or more instructions, when executed by the processor, further cause the determination device to:

acquire a number of times of flashing of a brake lamp of the second vehicle, and to set the acquired number of times of flashing as the number of times of deceleration.

7. A determination method of determining whether a second vehicle traveling in front of a first vehicle is road-raging at the first vehicle, the determination method comprising:

determining whether the first vehicle and the second vehicle are in a predetermined close state;

determining whether a third vehicle traveling in front of the second vehicle exists; and avoiding determining whether road rage occurs when at least one condition of a first condition that the predetermined close state is determined to exist or a second condition that the third vehicle is determined not to exist is not satisfied;

determining that road rage occurs when the first condition and the second condition are satisfied;

based on determining the first condition and the second condition are satisfied, and a legal minimum speed limit set to a road on which the first vehicle and the second vehicle are traveling is acquired, avoiding determining whether road rage occurs when a vehicle speed of one of the first vehicle or the second vehicle is equal to or higher than the legal minimum speed limit, and determine that road rage occurs when the vehicle speed of one of the first vehicle or the second vehicle falls below the legal minimum speed limit;

based on determining at least one of the first vehicle or the second vehicle has stopped under a state in which a degree of mutual closeness is high after the first condition and the second condition are satisfied, avoiding determining whether road rage occurs when a place of the stop is outside a no-parking and no-stopping section, and determine that road rage occurs when the place of the stop is inside the no-parking and no-stopping section; and controlling a dashboard camera installed on the first vehicle to start recording based on determining that road rage occurs.

8. A non-transitory computer readable medium having instructions stored therein, which when executed by a processor in a determination device for determining whether a second vehicle traveling in front of a first vehicle is road-raging at the first vehicle, cause the processor to execute a method comprising:

determining whether the first vehicle and the second vehicle are in a predetermined close state;

determining whether a third vehicle traveling in front of the second vehicle exists; and avoiding determining that road rage occurs when when at least one condition of a first condition that the predetermined close state is determined to exist or a second condition that the third vehicle is determined not to exist is not satisfied;

determining that road rage occurs when the first condition and the second condition are satisfied;

based on determining the first condition and the second condition are satisfied, and a legal minimum speed limit set to a road on which the first vehicle and the second vehicle are traveling is acquired, avoiding determining whether road rage occurs when a vehicle speed of one of the first vehicle or the second vehicle is equal to or higher than the legal minimum speed limit, and determine that road rage occurs when the vehicle speed of one of the first vehicle or the second vehicle falls below the legal minimum speed limit;

based on determining at least one of the first vehicle or the second vehicle has stopped under a state in which a degree of mutual closeness is high after the first condition and the second condition are satisfied, avoiding determining whether road rage occurs when a place of the stop is outside a no-parking and no-stopping section, and determine that road rage occurs when the place of the stop is inside the no-parking and no-stopping section; and controlling a dashboard camera installed on the first vehicle to start recording based on determining that road rage occurs.

9. The determination device according to claim 2, wherein the one or more instructions, when executed by the processor, cause the determination device to:

determine that the predetermined close state exists when a number of times of deceleration of the second vehicle reaches a predetermined number of times within a predetermined time.

* * * * *